(12) United States Patent
Higashi

(10) Patent No.: US 7,733,299 B2
(45) Date of Patent: Jun. 8, 2010

(54) PLASMA TELEVISION AND IMAGE DISPLAY DEVICE

(76) Inventor: Norihiro Higashi, c/o Funai Electric Co., Ltd. 7-1, 7-chome Nakagaito, Daito-shi, Osaka (JP) 574-0013

( * ) Notice: Subject to any disclaimer, the term of this patent is extended or adjusted under 35 U.S.C. 154(b) by 956 days.

(21) Appl. No.: 11/493,099

(22) Filed: Jul. 25, 2006

(65) Prior Publication Data

US 2007/0024531 A1 Feb. 1, 2007

(30) Foreign Application Priority Data

Jul. 28, 2005 (JP) ............ 2005-006033 U

(51) Int. Cl.
*H04N 7/01* (2006.01)
*H04N 11/20* (2006.01)
(52) U.S. Cl. ............ 345/55; 348/173; 348/455
(58) Field of Classification Search ............ 345/173, 345/913
See application file for complete search history.

(56) References Cited

U.S. PATENT DOCUMENTS 5,144,426 A * 9/1992 Tanaka et al. .......... 375/240.13
5,594,807 A * 1/1997 Liu ...................... 382/128
2004/0100584 A1* 5/2004 Takagi et al. ............ 348/556
2006/0221186 A1* 10/2006 Lin et al. ................ 348/173

FOREIGN PATENT DOCUMENTS

| JP | 02-228179 | 9/1990 |
|----|-----------|--------|
| JP | 2001-175212 | 6/2001 |
| JP | 2004-144819 | 5/2004 |

OTHER PUBLICATIONS

Machine translation of JP2001-175212.*

* cited by examiner

*Primary Examiner*—Amare Mengistu
*Assistant Examiner*—Antonio Xavier

(57) ABSTRACT

When a target image with an aspect ratio of 4:3 is displayed on the screen A of the PDP26 with an aspect ratio of 16:9, the rectangular black images on the left and right of the target image are not solid black. Instead, the luminance of the rectangular black images is lowered stepwise as it becomes more distant from the boundary of the target image, and finally reduced to substantially zero, or to a black image at a position away from the boundary to some extent. This prevents the luminance from sharply falling from the boundary and edge from causing due to the addition of the rectangular black image, thereby preventing burning on a part of the screen A corresponding to the position of the boundary.

2 Claims, 6 Drawing Sheets

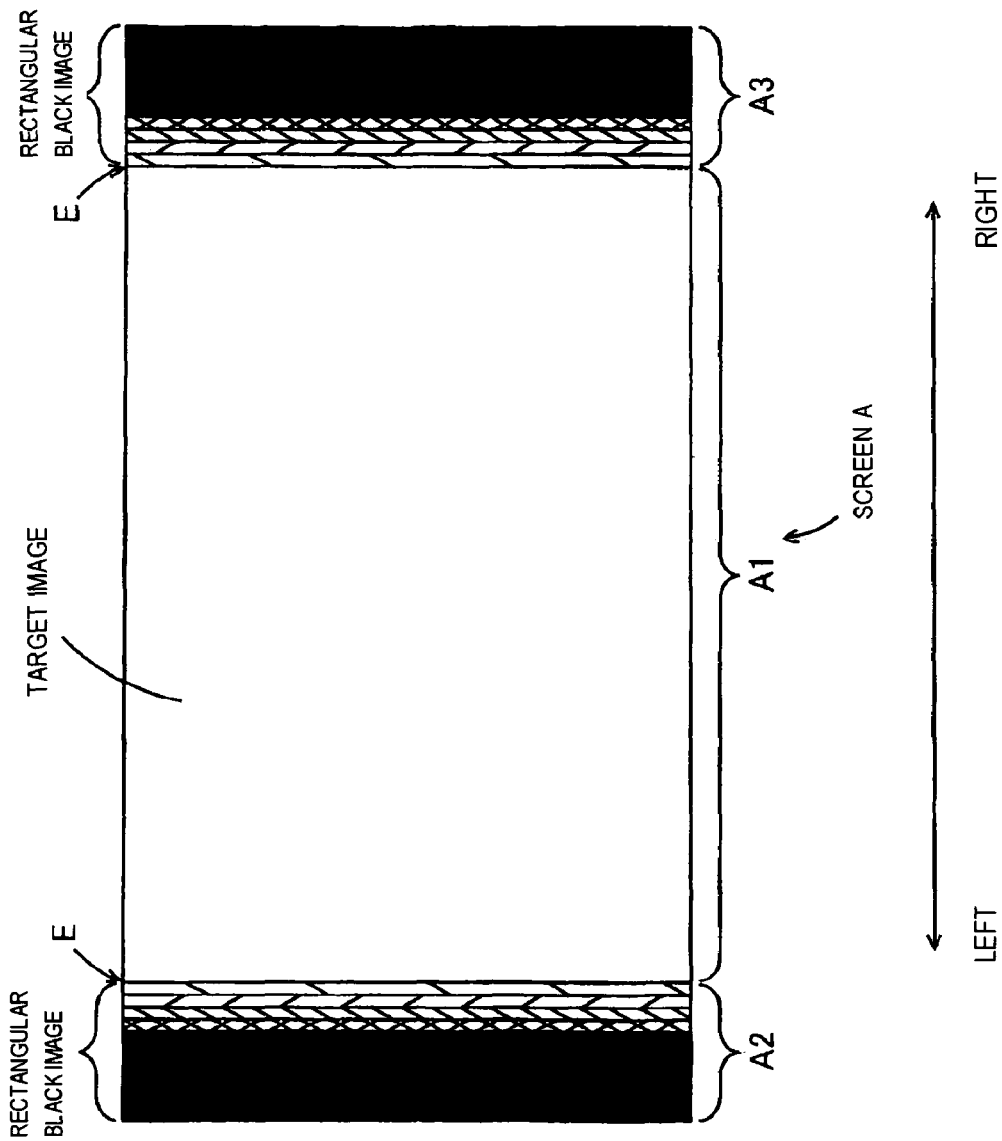

PLASMA TELEVISION AND IMAGE DISPLAY DEVICE

CROSS-REFERENCES TO RELATED APPLICATIONS

The present application is related to the Japanese Utility Model Application No. 2005-6033, filed Jul. 28, 2005, the entire disclosure of which is expressly incorporated by reference herein.

BACKGROUND OF THE INVENTION (1) Field of the Invention

The present invention relates to a plasma television and image display device capable of displaying an image different in aspect ratio from a display screen thereon.

(2) Description of Related Art

An image display device is known as prior art for example disclosed in the following document, that corrects the luminance level of video display signals displayed on a display screen between a display and a non-display area based on the correction data when a partial screen display mode is switched to a whole screen display mode (refer to Japanese Patent Laid-Open No. 2004-144819).

In the above patent document, no measures to prevent burning occurring in the partial display mode have been taken. This virtually allows burning on a screen attributed by a partial display.

In the document, a video display signal itself is corrected to change its luminance in the whole screen display mode. For this reason, atmosphere of an image such as brightness of the image may be displayed differently from an original intention of the inputted video display signal.

BRIEF SUMMARY OF THE INVENTION

The present invention discloses a plasma television and an image display device capable of preventing burning on the screen from occurring when an image different in aspect ratio from a display screen is displayed thereon.

One aspect of the present invention provides an image display device comprising: receiving unit for receiving digital broadcasting signals; and display control unit for causing a display screen to display a rectangular black image at the areas other than an image in the display screen when the image based on a received digital broadcasting signal is displayed on the display screen with a predetermined aspect ratio and the image is different in aspect ratio from the display screen; wherein the display control unit allows the display screen to display a rectangular black image of which luminance is lowered stepwise as it becomes more distant from the boundary of the image based on the digital broadcasting signal at the areas other than the image.

In the present invention constituted in the above, the display control unit allows a display screen to display not merely a solid black image but a rectangular black image of which luminance lowers stepwise as it becomes more distant from the boundary of the image at the areas other than the above image.

That is to say, according to the present invention, luminance is lowered not sharply but gradually at the boundary between the image based on the digital broadcasting signal and the area other than the image, which makes it difficult to cause burning on the screen occurred conventionally due to sharp change in luminance at the boundary.

An optional aspect of the present invention provides the image display device, wherein the display control unit determines whether the rectangular black image needs to be displayed by obtaining aspect information showing the aspect ratio of an image from the digital broadcasting signal.

That is to say, since the digital broadcasting signal stores aspect information showing the aspect ratio of an image, the display control unit readily determines whether the rectangular black image needs to be displayed by extracting aspect information from the received digital broadcasting signal.

An optional aspect of the present invention provides the image display device, wherein the display control unit obtains luminances at the ends of the image adjacent to the areas other than the image in the area of the image and allows a display screen to display the rectangular black image of which the luminances is lowered stepwise from the luminances at the ends to a predetermined minimum luminance at the areas other than the image.

That is to say, the display control unit lowers luminance stepwise at the boundary from the luminances at the ends of the image taken as the maximum luminance to a predetermined minimum luminance substantially corresponding to black in the area other than the image. This allows luminance to surely and stepwisely lower from the ends adjacent to the area other than the image toward the outside of the screen, preventing sharp change in luminance in the vicinity of the boundary.

An optional aspect of the present invention provides the image display device, wherein the display control unit changes the number of steps when luminance is lowered from the luminance at the ends to the minimum luminance according to the level of luminance at the ends.

In the present invention constituted in the above, the number of steps is changed according to the level of the luminances at the ends when luminance is changed from luminances at the ends to the minimum luminances. For example, if an image is higher in luminance, the luminance is gradually lowered through more steps to the minimum at the area other than the image. If an image is lower in luminance, the luminance is lowered through fewer steps to the minimum at the area other than the image. As a result, no matter what level the luminance at the ends of the image is, the luminance can be surely lowered stepwise according to the level, which prevents the luminance in the vicinity of the boundary from sharply changing.

A luminance lowering width at each step may be common or different when luminance is lowered at a predetermined number of steps.

Based upon the above constitution, another aspect of present invention provides a plasma television comprising: receiving unit for receiving digital broadcasting signals; and display control unit for causing a plasma display panel to display a rectangular black image at the left and right areas of an image when the image based on a received digital broadcasting signal is displayed on the plasma display panel with an aspect ratio of 16:9 and an aspect ratio of the image is 4:3; wherein the display control unit determines whether the aspect ratio of the image is 4:3 by obtaining aspect information showing the aspect ratio of the image stored in transport stream obtained from the digital broadcasting signal, and on displaying the rectangular black image, obtains luminances at both ends of the image adjacent to the left and right areas respectively, and lowers the luminances stepwise from the luminances at the ends to a predetermined luminance in the left and right areas as it becomes more distant from the boundary of the image, and the number of steps is varied according to the level of the luminances at the left and right ends when the luminances at the ends are lowered to the minimum luminance.

It is to be understood that the same effects as in the above description may be served in a plasma television taken as a specific product in the present invention.

According to the present invention, as described above, when a rectangular black image is displayed at areas other than the image based on the digital broadcasting signal on a display screen, lowering luminance stepwise as it becomes more distant from the boundary of the image in the area where the rectangular black image is displayed prevents luminance of the screen from sharply lowering from the boundary, which surely prevents burning phenomena on the screen caused by such sharp change in luminance of the screen at the same position.

These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

Referring to the drawings in which like reference character(s) present corresponding parts throughout:

FIG. 6 shows an exemplary illustration of display on a screen to which the rectangular black image related to the present invention is added.

DETAILED DESCRIPTION OF THE INVENTION

The detailed description set forth below in connection with the appended drawings is intended as a description of presently preferred embodiments of the invention and is not intended to represent the only forms in which the present invention may be constructed and or utilized.

Figure 1:
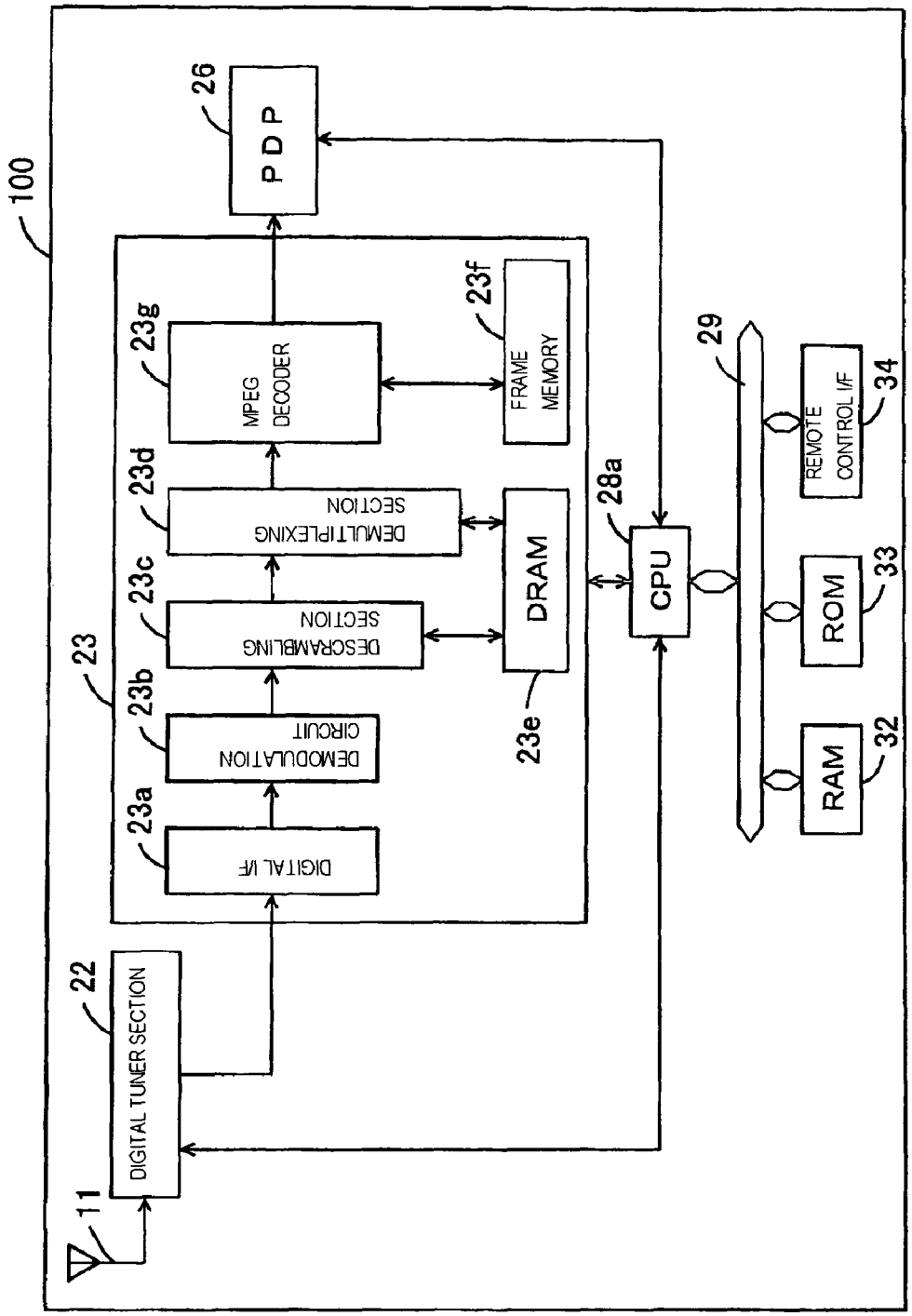
FIG. 1 is an exemplary illustration of a block diagram of a schematic configuration of a plasma television related to the present invention.

The embodiments of the present invention are described in the following order:
(1) Schematic configuration of a plasma television
(2) Process for adding a rectangular black image
(3) Summary
(1) Schematic Configuration of a Plasma Television FIG. 1 shows a block diagram of a schematic configuration of a plasma television related to a first embodiment of the present invention. A plasma television 100 is provided with a digital tuner section 22 for receiving a digital broadcasting signal from a television broadcasting station. An antenna section 11 is connected to the digital tuner section 22, frequency-converts a received digital broadcasting signal into an intermediate frequency signal in the low-noise converter section thereof, and outputs the intermediate frequency to a digital tuner section 22. The tuner section 22 selects one channel from among plural channels contained in the inputted immediate frequency signal according to a channel selection control signal outputted from a CPU 28a.

The CPU 28a is connected to a bus 29 and executes a program stored in a ROM 33 using a RAM 32 as a work area to allow a plasma television 100 to perform different functions thereof.

The output of the digital tuner section 22 is supplied to a digital reproducing section 23. The digital reproducing section 23 is composed of a digital I/F 23a, demodulation circuit 23b, descrambling section 23c, demultiplexing section 23d, and MPEG decoder 23g. The digital I/F 23a to which a frequency signal is inputted by the digital tuner 22 is provided with an A/D converter. A demodulation section supplied with signals by the digital I/F 23a is equipped with a channel equalizer, error correction decoding section and the like.

That is to say, the digital I/F 23a and the demodulation circuit 23b convert the frequency signal inputted from the digital tuner 22 to a digital signal and perform so-called "ghost canceling" of a digital demodulated signal according to control information from the CPU 28a. The digital I/F 23a and the demodulation circuit 23b also correct bit errors occurring on a transmission line and deliver a transport stream (TS) output. The demodulation circuit 23b detects the rate of the bit errors to the whole data as error rate through the above process.

The transport stream obtained by demodulation and error correction in the demodulation circuit 23b is supplied to the descrambling section 23c. The transport stream is usually scrambled, so that video and audio signals cannot be properly and directly reproduced. Then, the descrambling section 23c descrambles the transport stream to be restored to reproducible data arrangement. The descrambled transport stream in which video and audio signals and character information are multiplexed is supplied to a demultiplexing section 23d. The demultiplexing section 23d demultiplexes the input data. In other words, the section 23d removes multiplexing. The descrambling section 23c and the demultiplexing section 23d may use a DRAM 23e as a work area when descrambling and demultiplexing respectively.

Removing multiplexing through demultiplexing process separates the data into MPEG data produced by compressing video and audio signals by a predetermined format and data other than video and audio signals such as for example character information on programs, and the latter data are supplied to the CPU 28a. When MPEG data in a plurality of channels are multiplexed in a prescribed frequency band and transmitted, these data are also demultiplexed. The former MPEG data are supplied to an MPEG decoder 23g to be decompressed therein, that is to say, to be MPEG decoded. MPEG decoding of MPEG data produces digital video and audio signals. The CPU 28a scales the decoded digital video signal to produce image data for one screen and stores it in a frame memory 23f.

In the present embodiment, a rectangular black image data is also produced if needed when the above image data for one screen is produced. When the CPU 28a produces the rectangular black image data, it adds the rectangular black image data to the digital video signal expressing images based on the above digital broadcast signal, completes the image data for one screen and stores it in the frame memory 23f. Thus produced image data are supplied to a plasma display panel (PDP) 26 used as a video output section. The PDP 26 produces a panel driving signal based on the image data to drive each electrode thereof based on the driving signal, thereby offering a predetermined image display.

On the other hand, the audio signal produced by the MPEG decoding process is inputted to a D/A converter (not shown) to be converted to an analog audio signal. The analog audio signal is inputted to an audio output section (not shown) of the plasma television 100 to be outputted as speech.

(2) Process for Adding a Rectangular Black Image

In the present embodiment, a screen A of the above PDP 26 uses a model with an aspect ratio of 16:9. The following is a description of a process for displaying an image with an aspect ratio of 4:3 on the screen A.

Figure 2:
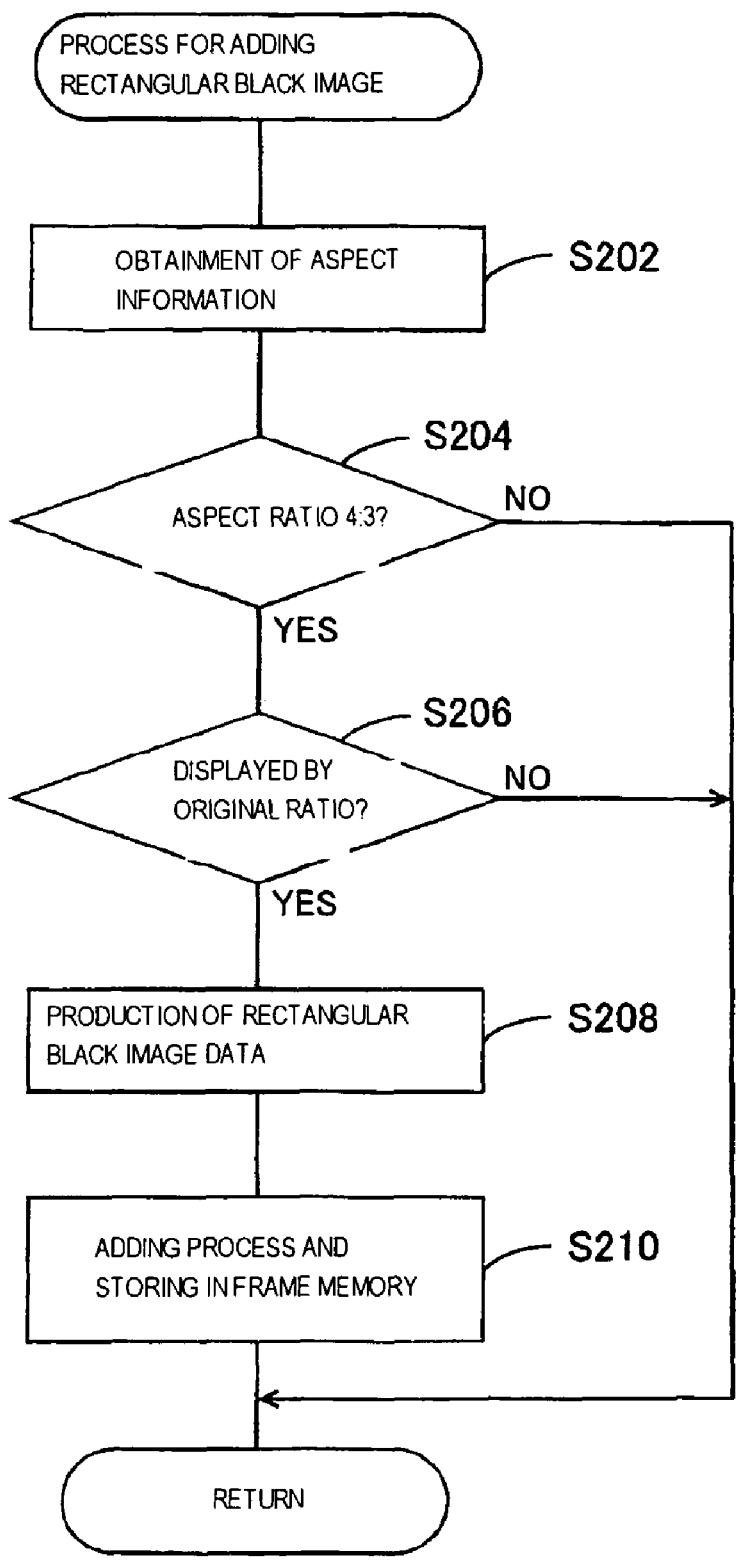
FIG. 2 is an exemplary illustration of a flow chart showing a process where a rectangular black image is added.

FIG. 2 shows how the rectangular black image is added by the CPU 28a with reference to a flow chart. The above adding process is executed when image data for one screen stored in the frame memory 23f are produced.

After the decoding process, the CPU 28a obtains aspect information showing an aspect ratio of a target image based on the digital video signal at the step S202. The aspect information is stored in a predetermined area of the above transport stream, for example, in the header area of a transport packet. However, the concept of the aspect information includes not only data directly showing the aspect ratio of an image, but all pieces of information by which the aspect ratio of an image can be identified. For example, the aspect ratio of an image sometimes can be identified from a television broadcasting system such as 480i and the like, in such a case, information identifying the system refers to aspect information.

The CPU 28a determines whether the aspect ratio of a target image is 4:3 at the step S204. If the aspect ratio is 4:3, the process proceeds to the step S206 because there is a need for adding the rectangular black image data. On the other hand, if the aspect ratio is not 4:3, in other words, if it is 16:9, the flow is terminated because there is no need for adding the rectangular black image data. For example, an image related to the signal of digital broadcasting format of 480p has an aspect ratio of 16:9.

The CPU 28a determines whether a mode is set for displaying a target image on the screen A with an original aspect ratio at the step S206. That is to say, when the image of the digital broadcasting signal is displayed, a user can select either of the following modes: the mode for display at an initial aspect ratio (display mode at original ratio); and the mode for changing the aspect ratio of an image to that of the screen A, that is, for horizontally enlarging an image with 4:3 to with 16:9 (horizontally long display mode). The CPU 28a determines whether a mode is set to the display mode at an original aspect ratio. If so, the process proceeds to the step S208.

If the display mode is set to the horizontally long display mode, the flow is terminated because there is no need for adding the rectangular black image data.

If the decisions are yes at both steps S204 and S206, the CPU 28a produces the rectangular black image data at the step S208.

The following is a detailed description of how the rectangular black image data are produced and processed.

Figure 3:
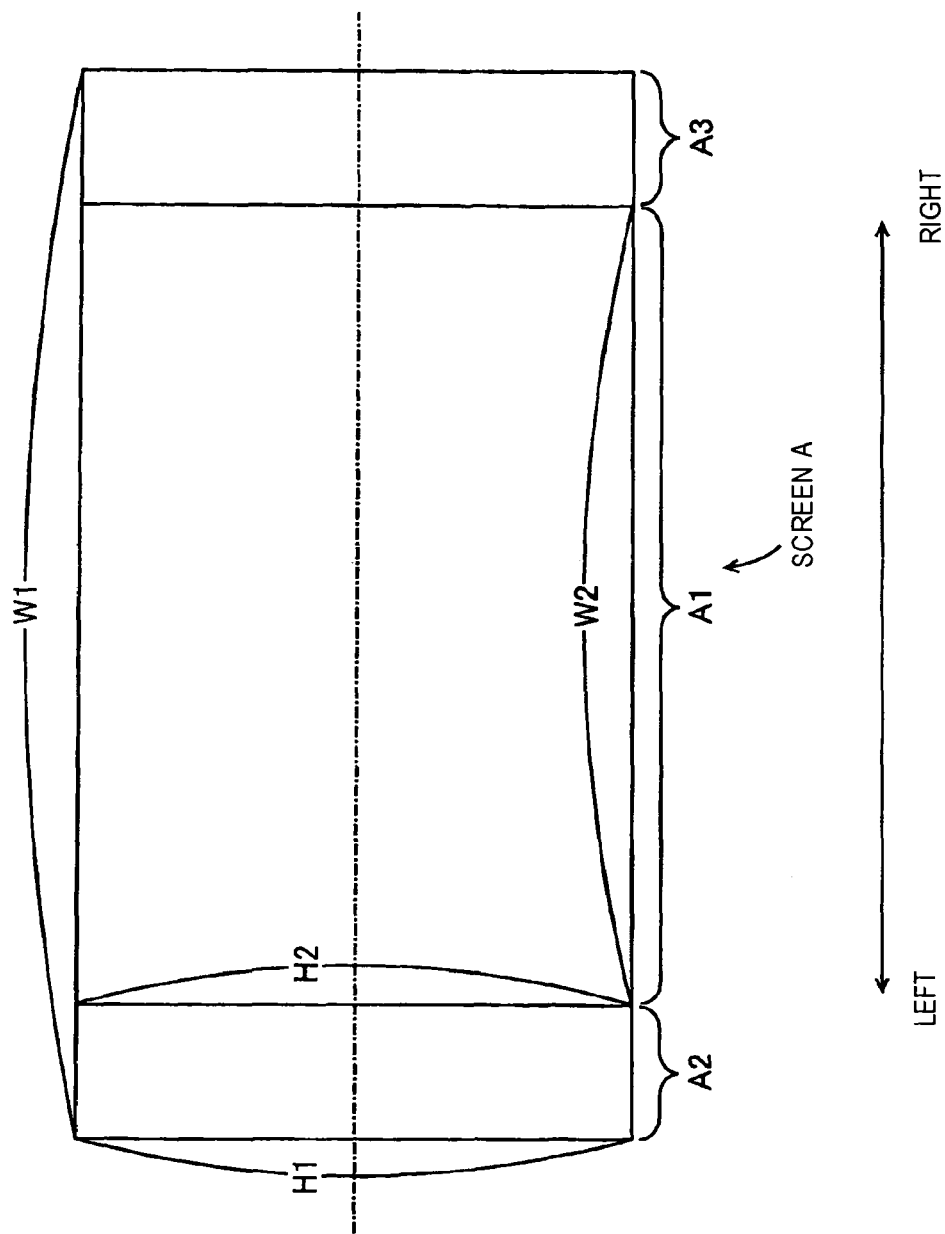
FIG. 3 shows an exemplary illustration of a positional relationship between a target image and the rectangular black image.

FIG. 3 shows an appearance of the screen A to which the rectangular black image is added. In the figure, the aspect ratio of the screen A is W1:H1=16:9, and an area A1 with W2:H2=4:3 exists at an approximate center of the screen A. That is, the aforementioned target image is outputted at the area A1 and the rectangular black image is outputted at the area A2 on the left side of the area A1 and at the area A3 on the right side thereof.

Since data of the picture elements on the screen A are expressed by digital gradation value for each of RGB, for example, by 256 gradation levels from 0 to 255, when the above areas A2 and A3 are taken as a rectangular black image, hitherto, all picture elements R, G and B in the areas A2 and A3 have been taken as zero (R=G=B=0), that is, luminance as zero (luminance is also expressed by 256 gradation levels from 0 to 255), which makes the areas A2 and A3 solid black.

In the present embodiment, however, the areas A2 and A3 are not made solid black. The CPU 28a provides a rectangular black image whose luminance varies, as described below.

Figure 4:
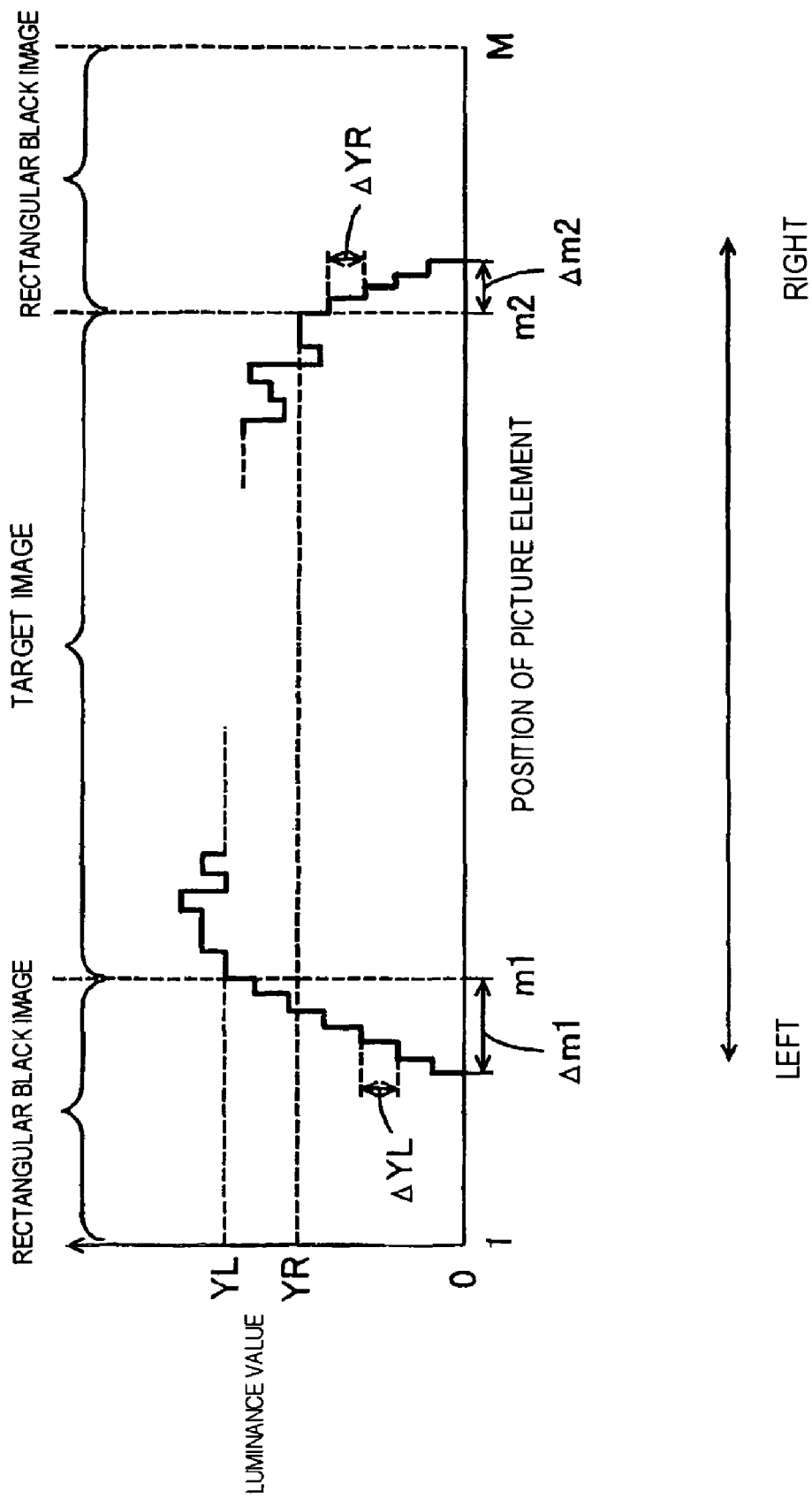
FIG. 4 shows an exemplary illustration of a variation of luminance in the horizontal direction.

FIG. 4 shows the variation of luminance in the horizontal direction in the image data for one screen. Specifically, it shows the variation of luminance of picture elements arranged along the alternate long and short dash line shown in FIG. 3.

In the figure, an abscissa shows the position of picture elements and an ordinate shows the luminance of the picture elements. Here, the number of picture elements in the horizontal direction on the screen A is taken as M. Each position of M picture elements is expressed by 1 to M in the order from the left end to the right end of the screen A.

A reference character "m1" denotes position in the leftmost picture element out of the picture elements forming a target image. A reference character "m2" indicates position in the rightmost picture element out of the picture elements forming the target image. In the range of a picture-element position of m1 to m2, the target image varies in luminance. The picture elements corresponding to the target image have digital gradation values for each of RGB as data. The luminances of the picture elements can be obtained by adding digital gradation values for each of RGB weighted by a specific coefficient.

The picture elements in the ranges of the picture-element position from 1 to m1−1 corresponding to the area A2 and of the picture-element position from m2+1 to M corresponding to the area A3 have rectangular black image data (luminance) for displaying the rectangular black image. Schematically, the CPU 28a provides each picture element according to the position thereof with luminance lowered stepwise as it becomes more distant from the boundary between the areas of the target image and rectangular black image outward in the horizontal direction.

More specifically, the rectangular black image is determined below.

First, the CPU 28a obtains a luminance YL of the picture element at the left end of a target image to produce the rectangular black image data corresponding to the area A2. Secondly, the difference between the luminance YL and a predetermined luminance Ymin, basically Ymin=0, is obtained. The difference is divided by a predetermined number of steps D. The value obtained by dividing the difference by the number of steps D is taken as a "luminance lowering width ΔYL" per step. The number of steps D refers to how many steps are required to lower luminance from the luminance YL to the minimum luminance Ymin in the area A2. The number of steps may be always constant, or may vary with the level of the "luminances at the ends" (a generic term of the luminance YL of the picture element at the left end and luminance YR of the picture element at the right end).

When luminance is lowered as it becomes more distant from the boundary in the horizontal direction, it may be lowered every picture element, or every predetermined number(two or more) of picture elements continuing in the horizontal direction taken as one step. If three horizontally consecutive picture elements are taken as a unit of one step, for example, the luminance of the three picture elements consecutive in the left direction from the picture element at the left end is determined as YL−ΔYL. Thereafter, luminance is lowered every "luminance lowering width ΔYL" with the three picture elements consecutive in the left direction as a unit. Finally, luminance is lowered to the minimum luminance Ymin at a position away in the left direction by some picture elements from the picture element at the left end.

A reference character "Δm1" signifies the width of picture elements obtained by multiplying the number of steps D by the number of the picture elements forming one step. As a result, an area within the width of picture elements in the area A2 is displayed in gray gradation. The other area excluding the width of picture elements in the area A2 is solid black.

The number of steps D can be changed according to the level of the luminances at the ends by the following configuration.

Figure 5:
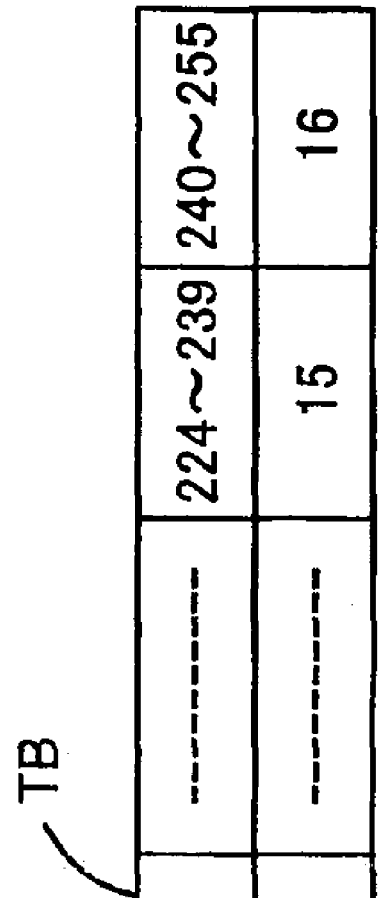
FIG. 5 shows an exemplary illustration of a table for determining the number of steps.

FIG. 5 shows a table for determining the number of steps.

The table TB for determining the number of steps acts to determine the corresponding relationship between luminance at the end and the number of steps D. In the table, 0 to 255 gradations available in the luminance at the end are divided into 16 ranges to each of which the number of steps D from 1 to 16 corresponds in sequence. That is to say, the higher the level of the luminance at the end, the more the number of steps D.

If the number of steps D is changed according to the level of the luminance at the end, the table TB for determining the number of steps is stored beforehand in a storage device such as the ROM 33 and the like. When the CPU 28a executes the process of the step S208, it determines the luminance at the end and the number of steps D with reference to the table. As a result, when the luminance at the end is higher, the luminance can be lowered through more steps to the minimum luminance value Y1min from the boundary in the outward direction of the screen. On the other hand, when the luminance at the end is originally lower, the luminance can be lowered through fewer steps from the boundary in the outward direction of the screen. As a result, no matter what level the luminance at the end is, the luminance of the rectangular black part can be lowered from the luminance at the end to the minimum luminance Ymin through suitable number of steps, which surely prevents the luminance in the vicinity of the boundary from sharply changing.

Similarly to the above, the CPU 28a obtains a luminance YR of the picture element in the right end of a target image to produce the rectangular black image data corresponding to the area A2. Then, the difference between the luminance YR and a predetermined luminance Ymin is obtained. The value obtained by dividing the difference by the number of steps D is taken as a "luminance lowering width ΔYR" per step. The luminance of the picture elements is lowered stepwise from the picture element at the right end to the right direction in the area A3 based on the luminance lowering width ΔYR and the number of steps D.

At the step S210, the CPU 28a adds the rectangular black image data produced through determining the luminance of the picture elements at the areas A2 and A3, as described above, to the left and right of the image expressed by the digital video signal, thereby producing the image data with a whole aspect ratio of 16:9. Then, the image data is stored in the frame memory 23f.

From now onward, as described above, the PDP 26 displays image on the screen A according to the image data. Incidentally, if the CPU28a determines "No" at either of the steps S204 or S206, not a rectangular black image, but a target image with an aspect ratio of 16:9 is displayed on the screen A.

FIG. 6 shows a rectangular black image and others displayed on the screen A based on the rectangular black image data produced by the above process.

In the figure, a target image with an aspect ratio of 4:3 is displayed on the area A1 and the rectangular black images are displayed on the areas A2 and A3. At the area A2, the luminance is lowered stepwise in the horizontal and leftward direction from the boundary E of the area A1 and finally the luminance is reduced to zero through plural steps, which makes the image solid black. At the areas A2 and A3, the density of slanting lines represents shades of gray of the screen.

When the luminance of the rectangular black image is not changed in the vertical direction as shown in FIG. 6, the CPU 28a needs to obtain the average and the maximum value of the luminance at the end before determining the luminance lowering width ΔY and the number of steps D.

That is to say, the average of the luminance of the picture elements in one column at both sides adjacent to the left and right areas A2 and A3 among the picture elements in the target image (i.e., average of the luminance at the ends) is determined and taken as luminance YL of the picture element at the left end and as luminance YR of the picture element at the right end. Then, the luminance lowering width ΔY and the number of steps D at the left and right areas are determined respectively. Thereby, the rectangular black image can be displayed, of which the luminance is lowered stepwise in the horizontal and outward direction by appropriate luminance lowering width ΔY and the number of steps D, at the areas A2 and A3.

If the number of picture elements within a width of luminance lowered stepwise is fixed at w1, for example, the luminance lowering width ΔY can be taken as YL/w1 and YR/w1 every w1/D picture elements. If the number of steps D is fixed, the luminance lowering width ΔY can be taken as YL/D and YR/D every w1/D picture elements.

Alternatively, the maximum luminance of the picture element in one column at both sides adjacent to the left and right areas A2 and A3 among the picture elements in the target image (i.e., maximum luminance at the ends) is determined and taken as luminance YL of the picture element at the left end and as luminance YR of the picture element at the right end. Then, the luminance lowering width ΔY and the number of steps D at the left and right areas may be determined respectively.

In the above description, while the determination of the luminance at the ends and the number of steps D makes the luminance lowering width ΔY constant, the luminance lowering width at each step may be gradually widened or narrowed when luminance is lowered stepwise from the luminance at the ends to the minimum luminance Ymin.

For example, the luminance lowering width can be gradually widened stepwise by increasing the luminance lowering width ΔY by one gradation per picture element. That is, it is possible to take the luminance lowering width ΔY at positions in the areas A2 and A3 away from the area A1 by x picture elements as "x." On the other hand, as an example where the luminance lowering width is gradually narrowed stepwise, it is possible to take the luminance lowering width ΔY at positions in the areas A2 and A3 away from the area A1 by x picture elements as "$\Delta Y \times (1/2)^x$." This halves the luminance lowering width ΔY as it becomes closer to a side by one picture element.

In the above is described how to change the luminance in the horizontal direction on the left and right rectangular black images when a target image with an aspect ratio of 4:3 is displayed on the screen A with an aspect ratio of 16:9. This configuration can be applied to a case where the luminance in the vertical direction on the upper and lower rectangular black images is changed when a target image with an aspect ratio of 16:9 is displayed on the screen A with an aspect ratio of 4:3.

(3) Summary

According to the present invention, as described above, when a target image with an aspect ratio of 4:3 is displayed on the screen A of the PDP26 with an aspect ratio of 16:9, the rectangular black images on the left and right of the target image are not solid black. Instead, the luminance of the rectangular black images is lowered stepwise as it becomes more distant from the boundary of the target image, and finally reduced to substantially zero, or to a black image at a position away from the boundary to some extent. This prevents the luminance from sharply falling from the boundary and edge from occurring due to the addition of the rectangular black image, thereby preventing burning on a part of the screen A corresponding to the position of the boundary.

According to the present invention, data composing the target image are not subjected to luminance correction unlike the conventional art, which enables output to be displayed without ruining an original atmosphere of the target image such as brightness originally shown by the received digital video signal.

Although the invention has been described in considerable detail in language specific to structural features and or method acts, it is to be understood that the invention defined in the appended claims is not necessarily limited to the specific features or acts described. Rather, the specific features and acts are disclosed as preferred forms of implementing the claimed invention. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

What is claimed is:

1. An image display device comprising:
a receiving unit for receiving digital broadcasting signals; and
a display control unit for causing a display screen to display a rectangular black image at left and right areas of an image in the display screen when the image based on a received digital broadcasting signal is displayed on the display screen with a predetermined aspect ratio and the image is different in aspect ratio from the display screen;
the display control unit obtains a luminance of picture elements in one column at both ends of the image adjacent to the left and right areas respectively as respective left and right luminance of the left and right ends of the image, and allows the display screen to display the rectangular black image by stepwise lowering the left and right luminance away from the respective left and right ends to a predetermined minimum luminance of the left and right areas away from a boundary of the image at the left and right areas;
the display control unit changes a number of steps when luminance is lowered stepwise from the left and right luminance of the respective left and right ends to the minimum luminance according to a level of the luminance of the left and right ends; and
on gradually widening a luminance lowering width $\Delta Y$ at each step, the luminance lowering width $\Delta Y$ at a position in the respective left and right area away from the area of the image by x picture elements is taken as x by increasing the luminance lowering width $\Delta Y$ by one gradation per picture element.

2. An image display device comprising:
a receiving unit for receiving digital broadcasting signals; and
a display control unit for causing a display screen to display a rectangular black image at left and right areas of an image in the display screen when the image based on a received digital broadcasting signal is displayed on the display screen with a predetermined aspect ratio and the image is different in aspect ratio from the display screen;
the display control unit obtains a luminance of picture elements in one column at both ends of the image adjacent to the left and right areas respectively as respective left and right luminance of the left and right ends of the image, and allows the display screen to display the rectangular black image by stepwise lowering the left and right luminance away from the respective left and right ends to a predetermined minimum luminance of the left and right areas away from a boundary of the image at the left and right areas;
the display control unit changes a number of steps when luminance is lowered stepwise from the left and right luminance of the respective left and right ends to the minimum luminance according to a level of the luminance of the left and right ends;
on gradually narrowing a luminance lowering width $\Delta Y$ at each step, the luminance lowering width $\Delta Y$ at a position in the left and right area away from the area of the image by x picture elements is taken as $\Delta Y \times (1;2)^x$.

* * * * *